(12) United States Patent
Pelletier et al.

(10) Patent No.: US 6,327,354 B1
(45) Date of Patent: Dec. 4, 2001

(54) METHODS, SYSTEMS, AND ARTICLES FOR PROVIDING A FAMILY TELECOMMUNICATION SERVICE

(75) Inventors: Karen Jeanne Pelletier, Crystal Lake; Vanessa Besteda Jackson, Oak Park; Robert Joseph Thornberry, Jr., Wheaton, all of IL (US)

(73) Assignee: Ameritech Corporation, Hoffman Estates, IL (US)

(*) Notice: Subject to any disclaimer, the term of this patent is extended or adjusted under 35 U.S.C. 154(b) by 0 days.

(21) Appl. No.: 09/375,652

(22) Filed: Aug. 17, 1999

(51) Int. Cl.[7] ........................................ H04M 3/42
(52) U.S. Cl. ........................ 379/201.01; 379/211.02; 379/220.01
(58) Field of Search ................... 379/201, 142, 379/156, 157, 220, 221, 219, 211, 212

(56) References Cited

U.S. PATENT DOCUMENTS

| | | |
|---|---|---|
| 4,266,098 | 5/1981 | Novak . |
| 4,277,649 | 7/1981 | Sheinbein . |
| 4,899,373 | 2/1990 | Lee et al. . |
| 5,199,062 | 3/1993 | Von Meister et al. . |
| 5,222,120 | 6/1993 | McLeod et al. . |
| 5,274,695 | 12/1993 | Green . |
| 5,276,731 | 1/1994 | Arbel et al. . |
| 5,327,492 | 7/1994 | Parola . |
| 5,329,578 | 7/1994 | Brennan et al. . |
| 5,471,519 | 11/1995 | Howe et al. . |
| 5,511,111 | 4/1996 | Serbetcioglu et al. . |
| 5,526,406 | 6/1996 | Luneau . |
| 5,550,899 | 8/1996 | McLeod et al. . |
| 5,555,290 | 9/1996 | McLeod et al. . |
| 5,568,546 | 10/1996 | Marutiak . |
| 5,590,181 | 12/1996 | Hogan et al. . |
| 5,592,539 | 1/1997 | Amarant et al. . |
| 5,651,053 | 7/1997 | Mitchell . |
| 5,692,038 | 11/1997 | Kraus et al. . |
| 5,717,738 | 2/1998 | Gammel . |
| 5,745,553 | 4/1998 | Mirville et al. . |
| 5,768,356 | 6/1998 | McKendry et al. . |
| 5,796,812 | 8/1998 | Hanlon et al. . |
| 5,802,160 | 9/1998 | Kugell et al. . |
| 5,835,570 | 11/1998 | Wattenbarger . |
| 5,850,435 | 12/1998 | Devillier . |
| 5,867,494 | 2/1999 | Krishnaswamy et al. . |
| 5,867,495 | 2/1999 | Elliot et al. . |
| 5,875,240 | 2/1999 | Silverman . |
| 6,005,930 | 12/1999 | Baiyor et al. . |
| 6,009,159 | 12/1999 | Baiyor et al. . |
| 6,018,575 | 1/2000 | Gross et al. . |
| 6,026,149 | 2/2000 | Fuller et al. . |
| 6,031,903 | 2/2000 | Partridge, III . |
| 6,047,053 | 4/2000 | Miner et al. . |
| 6,069,946 | 5/2000 | Lieuwen . |
| 6,072,867 | 6/2000 | Lieuwen . |

Primary Examiner—Creighton Smith
(74) Attorney, Agent, or Firm—Brinks Hofer Gilson & Lione

(57) ABSTRACT

A menu is provided in a first telephone call. The menu provides a plurality of destination options including a first destination option for a residence of a family, a second destination option for a first member of the family at a first location other than the residence, and a third destination option for a second member of the family at a second location other than the residence. A selection of one of the destination options is received in the first telephone call. A second telephone call is initiated to a telephone number corresponding to the selection. The first telephone call and the second telephone call are connected.

16 Claims, 3 Drawing Sheets

METHODS, SYSTEMS, AND ARTICLES FOR PROVIDING A FAMILY TELECOMMUNICATION SERVICE

Related Applications

The present application is related to the following applications.

"Method and System for Providing Enhanced Caller Identification", having Ser. No. 09/122,165, filed Jul. 24, 1998;

"Method and System for Providing Enhanced Caller Identification", having Ser. No. 09/122,484, filed Jul. 24, 1998;

"Improved Method and System for Providing Enhanced Caller Identification", having Ser. No. 09/253,339, filed Feb. 19, 1999; and "Improved Convenience Features in a Method and System for Providing Enhanced Caller Identification", having Ser. No. 09/264,611, filed Mar. 9, 1999.

The subject matter of the above-identified related applications is hereby incorporated by reference into the disclosure of the present application.

TECHNICAL FIELD

The present invention relates to methods, systems, and articles for providing a telecommunication service.

BACKGROUND OF THE INVENTION 800-numbers and other toll-free telephone numbers are used for receiving telephone calls which are to be toll-free to calling parties. Any monthly and per-minute usage fees for incoming calls to a toll-free telephone number are charged to its subscriber.

Personal 800-number services are available to allow toll-free calls to be placed to a subscriber's home. Existing personal 800-number services are directed to one telephone number, which is usually the subscriber's home telephone. Since the subscriber is billed for incoming calls to his/her personal 800-number, the personal 800-number is typically made known to a limited number of persons. For example, the personal 800-number may be made known only to select relatives and friends.

Personal 800-number services are beneficial for individuals, such as business travelers, who wish to avoid hotel surcharges and collect call rates when calling home. Personal 800-number services are also beneficial for receiving calls from friends or relatives who do not have the financial wherewithal to keep in touch by telephone. A family with one or more children may establish a personal 800-number so that a child can make a toll-free call to home. This allows children away at college, for example, to make toll-free calls to home. The personal 800-number is also beneficial in emergency situations where a child, having no means of payment (e.g. coins or a calling card) for a pay telephone, needs to call a parent at home.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF PREFERRED EMBODIMENTS

A need exists for a personal toll-free telecommunication service which is not limited to calling home only, but includes other potential locations of one or more parents or other family members. A need also exists for a service in which young users (e.g. having ages from about 8 to about 16) need not remember various telephone numbers for various locations in order to contact one of their parents or family members. A further need exists to ubiquitously provide a service having the aforementioned benefits over a multi-LATA (local access and transport area) geographical region.

The present invention provides a residential, family telecommunication service which addresses these and other needs. Briefly, the family telecommunication service facilitates away-from-home access to home and other family member locations by providing a toll-free telephone number linked to a subscriber-defined connection menu. The connection menu provides options for connecting to various family members and/or locations. After a family member calls his/her family toll-free telephone number, the connection menu is provided in an audible message. For example, the message may comprise: "press 1 to call home, press 2 to call Mom at her office, press 3 to call Mom's cellular number, press 4 to call Dad at his office". In response to an input indicating a selected destination, a call is initiated to the selected destination. Embodiments of the herein-described service are amenable for use by a child at school who wishes to call a parent, a child at a pay telephone who wishes to call home, a child away at camp who wishes to call home, and a college student who wishes to call home, for example.

Figure 1:
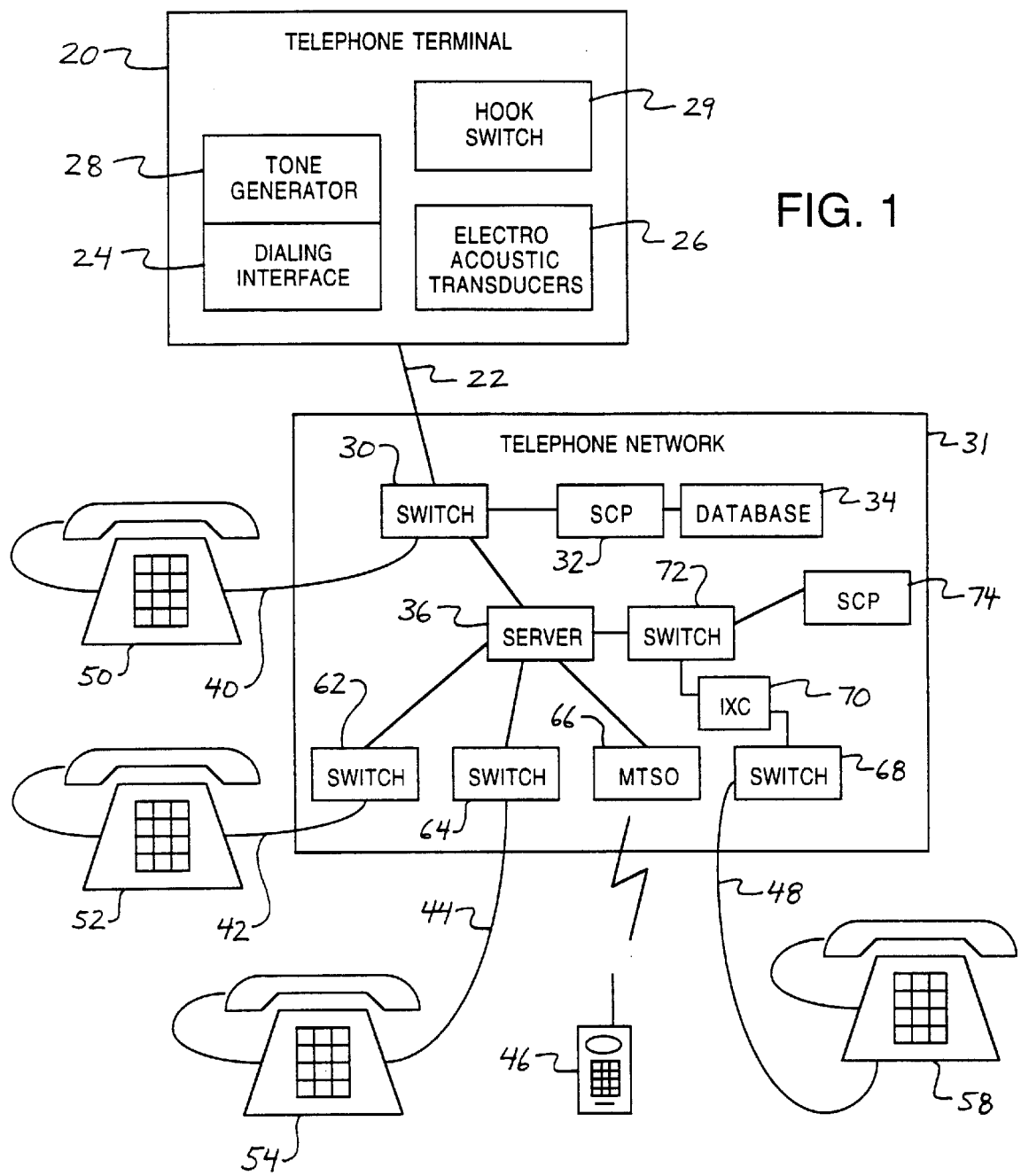
FIG. 1 is a schematic/block diagram of an embodiment of a system for providing a family telecommunication service.
Figure 2:
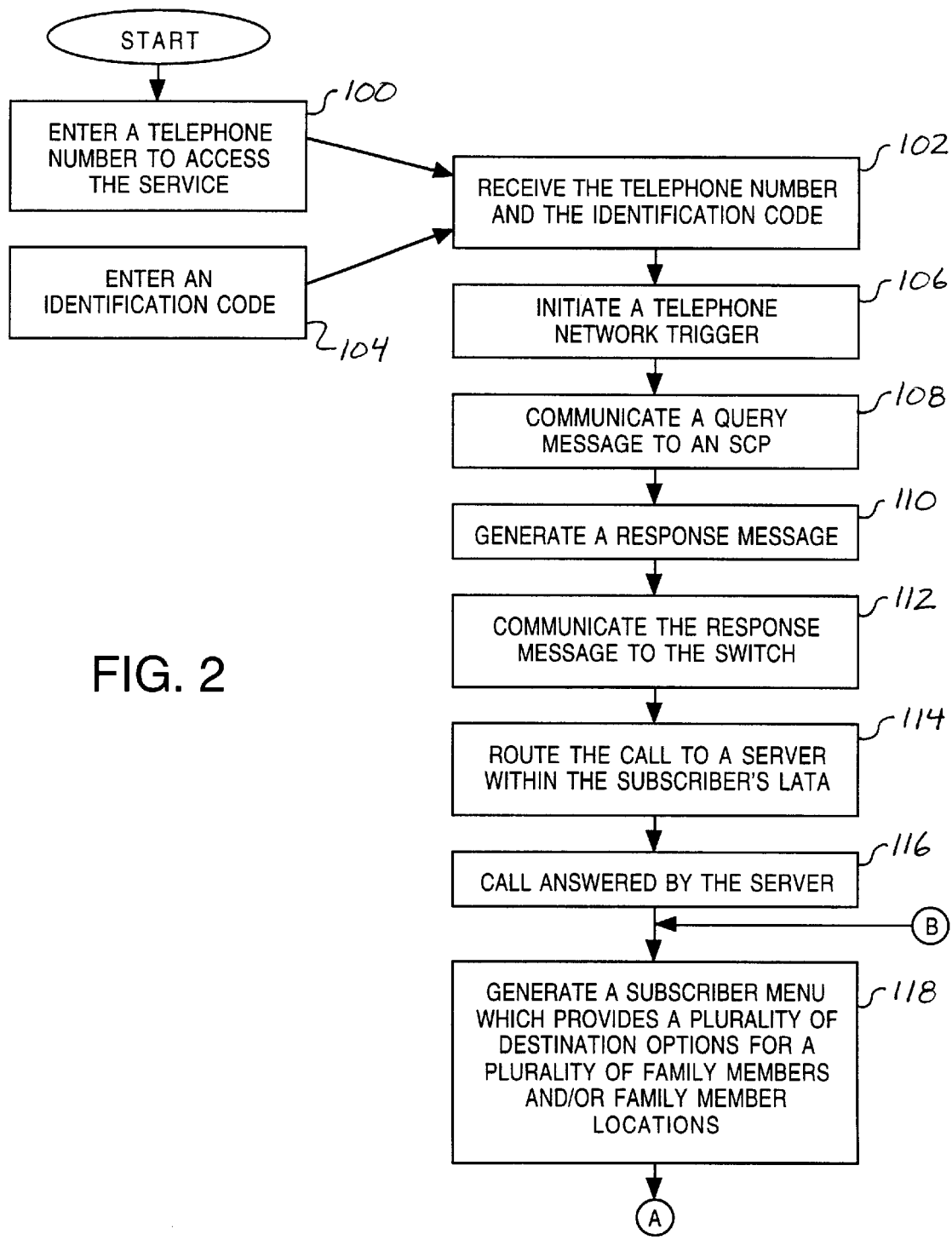
FIGS. 2 and 3 are a flow chart of an embodiment of a method of providing a family telecommunication service.
Figure 3:
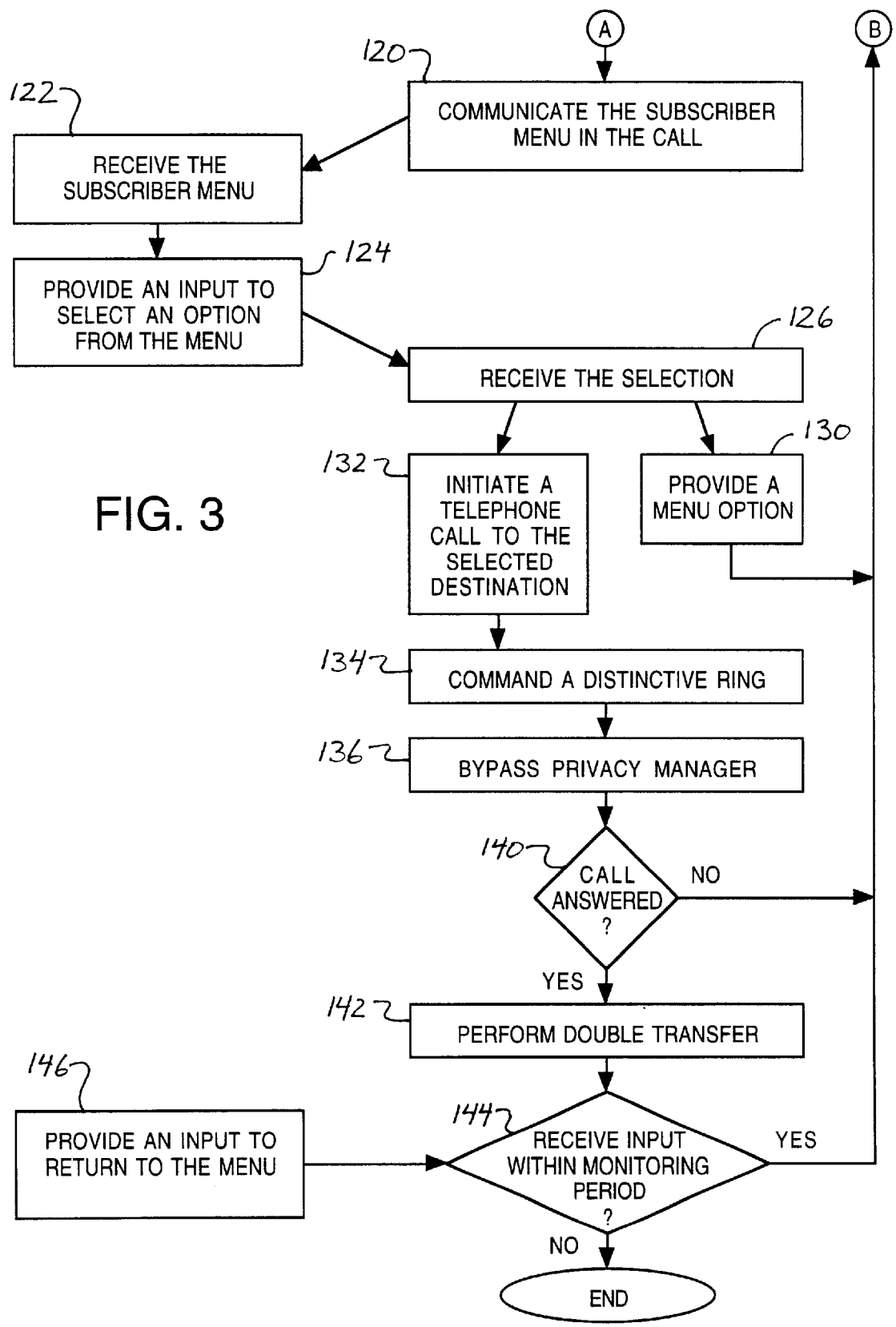

A description of embodiments of the family telecommunication service is made with reference to both FIG. 1, which shows a schematic/block diagram of an embodiment of a system for providing the family telecommunication service, and FIGS. 2 and 3, which show a flow chart of an embodiment of a method of providing the family telecommunication service. Based upon the herein-disclosed high-level description, one or more computer programs to direct telephone network elements to cooperate in providing the service logic are within the skill of a routineer in the art of telecommunications.

As indicated by block 100, a calling party initiates a telephone call by entering or otherwise providing a telephone number for accessing the family telecommunication service. Preferably, the telephone number comprises a toll-free telephone number. Examples of the toll-free number include, but are not limited to, those prefaced by "800", "888", or "877".

For purposes of illustration and example, the telephone number is provided by an end user using a telephone terminal 20 connected to a telephone line 22. Examples of the telephone terminal 20 include, but are not limited to, a telephone set, a facsimile machine, and a computer having a modem.

Regardless of its specific form, the telephone terminal 20 comprises a dialing interface 24 and one or more electroacoustic transducers 26. Preferably, the dialing interface 24 comprises a standard telephone keypad having dialing digit keys of "0" to "9", a "*" key, and a "#" key. A tone generator 28 is responsive to the telephone keypad to generate dualtone multi-frequency (DTMF) signals. Signals generated by the tone generator 28 are applied to the telephone line 22. The electroacoustic transducers 26 may comprise a speaker to generate audible acoustic pressure waves based upon signals received from the telephone line 22, and a microphone to generate signals for transmission over the telephone line 22 based upon acoustic pressure waves sensed thereby.

Using a landline telephone set, for example, the end user can take the telephone off-hook using a hook switch 29 (e.g. by picking up a handset) and dial the toll-free telephone number using the dialing interface 24.

As indicated by block 102, the telephone number provided by the calling party is received by a telephone network element. Typically, the aforementioned telephone network element includes a switch 30 within a telephone network 31. The switch 30 may comprise a service switching point at a central office which serves the calling party. The telephone network 31 may comprise a public switched telephone network, for example.

Optionally, the calling party is required to enter an identification code, such as a personal identification number (PIN), as indicated by block 104. If so, the calling party may dial a PIN using the dialing interface 24. Alternatively, the calling party may speak an identification code into the microphone of the telephone terminal 20.

The identification code may be used to identify a subscriber of the family telecommunication service. In this case, for example, each of a plurality of different subscribers may access the family telecommunication service using the same toll-free telephone number. Preferably, however, each of a plurality of subscribers is assigned a corresponding one of a plurality of different toll-free telephone numbers for the family telecommunication service. In this case, one subscriber is uniquely assigned a first toll-free telephone number, and another subscriber is uniquely assigned a second toll-free telephone number to access the family telecommunication service. In either case, the identification code may be used to authorize access the family telecommunication service or to authorize access to a set of options in the service (e.g. an option to modify a subscriber menu). Access to the family telecommunication service may be denied upon receiving an incorrect code.

As indicated by block 106, a telephone network trigger is initiated based upon the dialed telephone number. The telephone network trigger is detected and initiated by the switch 30 or another telephone network element. Preferably, the telephone network trigger comprises an advanced intelligent network (AIN) trigger.

As indicated by block 108, the switch 30 communicates a query message to a service control point 32 in response to the telephone network trigger. The query message may include the dialed telephone number, and optionally, the PIN. The service control point 32 either includes or communicates with a database 34. The database 34 includes instructions for routing calls based upon the dialed telephone number, and optionally, the PIN. The database 34 may comprise a toll-free number database, for example.

As indicated by block 110, the service control point 32 generates a response message based upon the query message. The response message includes one or more call-handling instructions for routing the call to a server 36. The server 36 provides resources which assist in providing the family telecommunication service. The server 36 may comprise, for example, an intelligent peripheral or another telephone network element capable of providing audio messages, post-dialing digit collection, a subscriber database, voice recognition, and other resources. The server 36 may be either a network element or a non-network element. Preferably, the server 36 is a commercial server having line interfaces to switches in the telephone network 31. The server 36 may comprise, for example, a Sun Microsystems Enterprise 4000 server.

Preferably, the server 36 is located in the LATA of the subscriber's home or residence. In general, the LATA of the server 36 may either differ from or be the same as the LATA of the telephone line 22. To serve a geographical region comprising a plurality of LATAs, a plurality of servers are employed to provide the family telecommunication service. In this case, at least one of the servers is located in each of the LATAs providing the family telecommunication service.

As indicated by block 112, the service control point 32 communicates the response message to the switch 30. As indicated by block 114, the switch 30 routes the telephone call to the server 36 based upon the response message.

If the LATA of the telephone line 22 is the same as the LATA of the server 36, the telephone call is carried to the server 36 by a local exchange carrier (LEC). If the LATA of the telephone line 22 differs from the LATA of the server 36, the telephone call is carried to the server by an interexchange carrier (IXC). In this case, the response message preferably indicates a subscriber-selected IXC to carry the telephone call to the server 36.

As indicated by block 116, the server 36 answers the telephone call. Based on the telephone number provided in block 100 and/or the identification code provided in block 104, the server 36 retrieves a subscriber menu from the subscriber database. Typically, the subscriber database stores a plurality of such subscriber menus, wherein each subscriber menu is associated with a corresponding one of a plurality of subscribers to the family telecommunication service. The subscriber database also identifies a corresponding subscriber-selected IXC for each of the subscribers. Each subscriber-selected IXC is used to carry inter-LATA calls for providing the family telecommunication service to its corresponding subscriber.

The subscriber menu comprises an audio message containing verbal or spoken information indicating a plurality of destination options and a corresponding digit for each option. The destination options are audibly identified by a name and/or a familial relationship for each of a plurality of family members, and/or a corresponding family member location. Examples of familial relationships include mother, father, daughter, son, sister, brother, aunt, uncle, grandmother and grandfather. Examples of family member locations include a residence location such as a family home, and non-residence locations such as work and automobile. Optionally, a destination option may be at least partially identified by a type of receiver at the destination. For example, a destination option may be identified as being a telephone or a pager. As another option, a destination option may be at least partially identified by a type of telephone at the destination. For example, a destination option may be identified as being mobile, wireless, cellular, satellite or personal communication service (PCS).

The destination options may be limited to only family members. In this case, family members may be defined by blood relationships (e.g. a biological parent of a child) or legal relationships (e.g. a legal guardian of a child). In addition to family members, the destination options may include non-family members such as a babysitter of a child or a neighbor of the child.

For purposes of illustration and example, consider the menu-identified destination options for five different locations having telephone lines denoted by reference numerals 40, 42 and 44, a wireless telephone 46, and a telephone line 48. Each of the telephone lines 40, 42, 44 and 48 has a respective one of telephone terminals 50, 52, 54 and 58 in communication therewith. Each of the telephone lines 40, 42, 44 and 48 is served by a respective one of switches 30, 62, 64 and 68 in the telephone network 31. Although not illustrated as such, two or more of the telephone lines may be served by the same switch in the telephone network 31. The wireless telephone 46 is served by a mobile telephone switching office 66 in the telephone network 31.

Further for purposes of illustration and example, the telephone line 40 is associated with a family residence having a fictitious telephone number of 847/555-0121. The telephone line 42 is associated with a mother's place of work, and has a fictitious telephone number of 312/555-0132. The telephone line 44 is associated with a father's place of work, and has a fictitious telephone number of 708/555-0143. The wireless telephone 46 is the mother's cellular telephone, and has a fictitious telephone number of 847/555-0145. The telephone line 48 is associated with a place that the father is reachable when he is away on business in Detroit. The telephone line 48 has a fictitious telephone number of 313/555-0147.

In the aforementioned example, the subscriber menu may comprise the following audio message: "press 1 to call home, press 2 to call Mom at her office, press 3 to call Mom's cellular number, press 4 to call Dad at his office, press5 to call Dad in Detroit".

In addition, the audio message may provide a broadcast option to call a plurality of, and preferably all of, the destinations in the subscriber menu. Here, the audio message may further comprise: "press 8 to call all of the destinations". Further, the audio message may provide an option to repeat the destination options. For example, the audio message may further comprise: "press 9 to repeat the menu". The audio message may also provide an option to return to the menu after a selection has been made. For example, the audio message may further comprise: "press # to return to the menu".

Optionally, if the server 36 includes a voice recognition resource, the audio message may provide options in the form of "press or say" a digit to call a desired destination, or to select an option.

As indicated by block 118, at least a portion of the subscriber menu is audibly generated by the server 36. The subscriber menu may be generated using speech synthesis and/or speech playback. As indicated by block 120, at least a portion of the audible subscriber menu is communicated, in the telephone call, to the calling party. The audible subscriber menu is communicated from the server 36 to the telephone line 22 via the switch 30.

As indicated by block 122, at least a portion of the audible subscriber menu is received by the calling party. The audible subscriber menu is received by the telephone terminal 20 via the telephone line 22. The subscriber menu is made audible to the end user by one of electroacoustic transducers 26 of the telephone terminal 20.

As indicated by block 124, the end user provides a selection of one of the menu options. The selection may indicate a selected destination option from the menu, or another option such as to repeat the menu or to return to the menu. To provide the selection, the end user may provide a dialed input using the dialing interface 24. Preferably, the dialed input consists of a single dialed key selected from the digits 0 to 9, the # key, and the * key. If the server 36 is capable of voice recognition, the end user may provide the selection by speaking an input into the microphone of the telephone terminal 20.

As indicated by block 126, the input is received by the server 36 from the calling party via the telephone network 10. Dialed input is determined by a post-dialing digit collection/detection resource of the server 36. If the end user provides a spoken input, the server 36 determines the selected destination option using a voice recognition resource.

If the input indicates a repeat-menu option, a return-to-menu option, or another non-call option, the selected option is provided, as indicated by block 130.

If the input indicates a selected destination option from the menu, the server 36 initiates a telephone call to the telephone number associated with the destination option, as indicated by block 132. Optionally, as indicated by block 134, the server 36 commands the telephone call to have a distinctive ring associated with the family telecommunication service. As a result, a called party is alerted that an incoming call is associated with the family telecommunication service.

As another option, as indicated by block 136, the server 36 may command that the telephone call passes a privacy manager device associated with the telephone number of the selected destination. Embodiments of privacy manager devices and methods are disclosed in the above-identified related applications which are incorporated by reference into this disclosure. For calls in which caller identification information is blocked, unavailable, or incomplete, the privacy manager device may request that the calling party provides audible caller identification information before connecting a call to the called party.

Preferably, the server 36 provides caller identification information which ensures passage of the privacy manager device without the calling party having to provide audible information. For example, if the telephone terminal 20 comprises a pay telephone, and calls from the pay telephone do not provide caller identification information to pass the privacy manager device, the server 36 would ensure that information to pass the privacy manager device is provided in the telephone call to the selected destination. Alternatively, the server 36 may command that the telephone call bypasses the privacy manager device or conditions set in the privacy manager device.

The server 36 determines whether the selected destination terminates in the same LATA as the LATA of the server 36, or in a different LATA as the LATA of the server. Where the server 36 determines that the selected destination terminates in a LATA other than the LATA for the server 36, the server 36 retrieves a carrier code of the subscriber-selected IXC from the subscriber database, and dials the carrier code plus the telephone number of the selected destination. If the selected destination is in the same LATA as the LATA of the server 36, the telephone call to the selected destination is carried by a local exchange carrier.

Continuing with the above example, if the dialed input comprises the "1" key, the server 36 initiates a telephone call to the telephone line 40 having a telephone number of 847/555-0120. If the dialed input comprises the "2" key, the server 36 initiates a telephone call to the telephone line 42 having a telephone number of 312/555-1032. If the dialed input comprises the "3" key, the server 36 initiates a telephone call to the wireless telephone 46 having a telephone number of 847/555-0145. If the dialed input comprises the "4" key, the server 36 initiates a telephone call to the telephone line 44 having a telephone number of 708/555-0143.

If the dialed input comprises the "5", key, the server 36 determines that the destination is in a different LATA, retrieves a subscriber-selected carrier code from the subscriber database, and initiates a telephone call to the telephone line 48 by dialing the subscriber-selected carrier code plus the telephone number of 313/555-0147. An interexchange carrier 70 identified by the subscriber-selected carrier code carries the telephone call to the switch 68. The switch 68 communicates the telephone call to the telephone line 48.

Preferably, the server 36 and the interexchange carrier 70 communicate the telephone call via an intervening switch 72. In this case, the switch 72 receives the aforementioned subscriber-selected carrier code and telephone number outputted by a line interface of the server 36. In response thereto, the switch 72 initiates a telephone network trigger, and sends a query message to a service control point 74. The trigger is used to direct the switch 72 to use the subscriber's telephone number as a billing number for the telephone call between the server 36 and the telephone line 48.

Alternatively, the server 36 and the interexchange carrier 70 can communicate the telephone call without an intervening switch, e.g. if the server 36 is a telephone network element.

If the dialed input comprises the "8" key, the server 36 dials all of the telephone numbers for telephone lines 40, 42, 44 and 48, and for the wireless telephone 46. The server 36 may dial the telephone numbers substantially simultaneously, i.e. so that calls are concurrently placed to the telephone numbers.

As indicated by block 140, the server 36 determines whether the telephone call to the telephone number associated with the selected destination is answered. A telephone call may be considered as being unanswered if there is no answer after a specific number of rings. Alternatively, a telephone call may be considered as being unanswered if there is no answer after a specific time period. As another alternative, a telephone call may be considered as being unanswered in response to receiving a caller-selected option.

If no one answers at the telephone number associated with the selected destination, the initial telephone call to the server 36 is maintained, and a second selection is audibly requested by the server 36. In this case, the server 36 may re-generate and communicate the subscriber menu to the calling party. Thereafter, the end user may make another selection from the menu, which is processed by the server 36.

If the telephone call to the telephone number associated with the selected destination is answered, the server 36 performs a double transfer or otherwise connects the telephone call and the initial telephone call, as indicated by block 142. As a result, the calling party may communicate with a party at the selected destination.

In the case where the broadcast option was selected, the server 36 detects that one of the destinations has answered the telephone call. In response thereto, the server 36 connects the initial telephone call to the telephone call to the aforementioned destination, and may cancel the telephone calls to the other destinations.

Thereafter, as indicated by block 144, the server 36 monitors the telephone call for a time period, such as 60 seconds. During this time period, the server 36 is responsive to dialed input received from the calling party, as indicated by block 146. For example, if the telephone call to the selected destination is answered by voice mail or an answering machine, the end user may dial "#" to return to the menu. In this case, the server 36 may re-generate and communicate the subscriber menu to the calling party. Thereafter, the end user may make another selection from the menu, which is processed by the server 36.

The subscriber is billed by the selected IXC for inter-LATA calls to the server 36. The subscriber is also billed by the selected IXC for inter-LATA calls from the server 36 to a destination. Preferably, the bill displays a date, time, origination telephone number, and call duration for each of the aforementioned inter-LATA calls. Charges for intra-LATA calls to the server 36 may be billed to the telephone number of the server 36. These charges may be absorbed as the cost of the service and included in a monthly subscription charge for the family telecommunication service.

It is noted that the herein-disclosed family communication service may connect a calling party with a selected destination using two inter-LATA calls: a first inter-LATA call between the calling party and the server 36, and a second inter-LATA call between the server 36 and the selected destination. In this case, the calling party is within a first LATA, the server 36 is located within a second LATA, and the selected destination is within a third LATA, wherein the first, second and third LATAs differ from each other.

Embodiments of the herein-disclosed methods may be directed by computer-readable instructions encoded on a computer-readable medium. The contents of the computer-readable medium cause one or more network elements to perform the herein-disclosed acts. For this purpose, at least one computer processor associated with the one or more of the herein-disclosed elements is responsive to the contents of the computer-readable medium.

Examples of the computer-readable medium include, but are not limited to, a computer-readable storage medium and a computer-readable communication medium. Examples of a computer-readable storage medium include, but are not limited to, an optical storage medium, an electronic storage medium, and a magnetic storage medium. The computer-readable storage medium may include stored data which encode computer program code and/or other computer-readable instructions.

Examples of a computer-readable communication medium include, but are not limited to, an optical communication medium, an electronic communication medium, and an electromagnetic communication medium. The contents of the computer-readable communication medium may include one or more waveforms which encode computer data such as computer program code and/or other computer-readable instructions.

Thus, there has been described herein several embodiments including preferred embodiments of a method, system and article for providing a family telecommunication service.

It will be apparent to those skilled in the art that the disclosed invention may be modified in numerous ways and may assume many embodiments other than the preferred form specifically set out and described above. For example, either in addition to or as an alternative to audibly presenting the menu, a visible representation of the menu may be provided to the calling party. The visible representation of the menu may be provided using a caller-identification display unit coupled to the telephone line 22. Although described for use with a wireline public switched telephone network, embodiments of the family telecommunication service also may be used in conjunction with a wireless telephone network.

Accordingly, it is intended by the appended claims to cover all modifications of the invention which fall within the true spirit and scope of the invention.

What is claimed is:

1. A method of providing a telecommunication service, the method comprising:

receiving, at a telephone network switch, a telephone number for accessing the telecommunication service for a subscriber, the telephone number provided by a calling party within a first local access and transport area;

determining an interexchange carrier associated with the subscriber;

initiating, via the interexchange carrier, a first telephone call between the calling party and a server which serves the subscriber, the server within a second local access and transport area other than the first local access and transport area;

using the server to provide a subscriber menu to the calling party in the first telephone call, the subscriber menu providing a plurality of destination options including a first destination option for a residence of a family and a second destination option for a first member of the family at a first location other than the residence;

receiving a selection of one of the destination options from the calling party;

initiating a second telephone call between the server and a telephone number corresponding to the selection; and connecting the first telephone call and the second telephone call.

2. The method of claim 1 further comprising:

providing information absent in the first telephone call to pass a privacy manager device associated with the telephone number for the second telephone call.

3. The method of claim 1 wherein the subscriber menu further provides a third destination option for a second member of the family at a second location other than the residence.

4. The method of claim 1 wherein the residence is located within the second local access and transport area.

5. The method of claim 1 wherein the second destination option has a telephone number within a third local access and transport area other than the first local access and transport area and the second local access and transport area, wherein the selection is of the second destination option, and wherein the second telephone call is carried by the interexchange carrier.

6. A system for providing a telecommunication service, the system comprising:

a database for determining an interexchange carrier associated with a subscriber of the telecommunication service;

a server to serve in providing the telecommunication service to the subscriber; and a telephone network switch to receive a telephone number for accessing the telecommunication service for the subscriber, the telephone number provided by a calling party within a first local access and transport area other than a second local access and transport area of the server, the telephone network switch responsive to the database to initiate, via the interexchange carrier, a first telephone call between the calling party and the server;

wherein the server is to provide a subscriber menu to the calling party in the first telephone call, the subscriber menu providing a plurality of destination options including a first destination option for a residence of a family and a second destination option for a first member of the family at a first location other than the residence;

wherein the server is to receive a selection of one of the destination options from the calling party and to initiate a second telephone call between the server and a telephone number corresponding to the selection; and wherein the server is to connect the first telephone call and the second telephone call.

7. The system of claim 6 further comprising:

a privacy manager device associated with the telephone number for the second telephone call;

wherein the second telephone call provides information absent in the first telephone call to pass the privacy manager device.

8. The system of claim 6 wherein the subscriber menu further provides a third destination option for a second member of the family at a second location other than the residence.

9. The system of claim 6 wherein the residence is located within the second local access and transport area.

10. The system of claim 6 wherein the second destination option has a telephone number within a third local access and transport area other than the first local access and transport area and the second local access and transport area, wherein the selection is of the second destination option, and wherein the second telephone call is carried by the interexchange carrier.

11. A method of providing a telecommunication service, the method comprising:

receiving, at a telephone network switch, a telephone number for accessing the telecommunication service for a subscriber, the telephone number provided by a calling party within a first local access and transport area;

initiating a first telephone call between the calling party and a server which serves the subscriber, the server within the first local access and transport area;

using the server to provide a subscriber menu to the calling party in the first telephone call, the subscriber menu providing a plurality of destination options including a first destination option for a residence of a family and a second destination option for a first member of the family at a first location other than the residence, wherein the residence is within the first local access and transport area, and wherein the first location is within a second local access and transport area other than the first local access and transport area;

receiving a selection of the second destination option from the calling party;

determining an interexchange carrier associated with the subscriber;

initiating, via the interexchange carrier, a second telephone call between the server and a telephone number corresponding to the second destination; and connecting the first telephone call and the second telephone call.

12. The method of claim 11 further comprising:

providing information absent in the first telephone call to pass a privacy manager device associated with the telephone number for the second telephone call.

13. The method of claim 11 wherein the subscriber menu further provides a third destination option for a second member of the family at a second location other than the residence.

14. A system for providing a telecommunication service, the system comprising:

a server to serve in providing the telecommunication service to a subscriber, the server within a first local access and transport area;

a database for determining an interexchange carrier associated with the subscriber of the telecommunication service; and a telephone network switch to receive a telephone number for accessing the telecommunication service for the subscriber, the telephone number provided by a calling party within the first local access and transport area, the telephone network switch to initiate a first telephone call between the calling party and the server;

wherein the server is to provide a subscriber menu to the calling party in the first telephone call, the subscriber menu providing a plurality of destination options including a first destination option for a residence of a family and a second destination option for a first member of the family at a first location other than the residence, wherein the residence is within the first local access and transport area, wherein the first location is within a second local access and transport area other than the first local access and transport area;

wherein the server receives a selection of the second destination option from the calling party, and initiates, via the interexchange carrier indicated by the database, a second telephone call between the server and a telephone number corresponding to the selection; and wherein the server is to connect the first telephone call and the second telephone call.

15. The system of claim 14 further comprising:

a privacy manager device associated with the telephone number for the second telephone call;

wherein the second telephone call provides information absent in the first telephone call to pass the privacy manager device.

16. The system of claim 14 wherein the subscriber menu further provides a third destination option for a second member of the family at a second location other than the residence.

* * * * *